United States Patent [19]

Deppe et al.

[11] Patent Number: 4,937,766
[45] Date of Patent: Jun. 26, 1990

[54] ACQUIRING DIMENSIONS OF A LARGE OBJECT

[75] Inventors: Gerd-Joachim Deppe, Krefeld; Wilhelm Fister, Neuss; Norbert Schoenartz, Duesseldorf, all of Fed. Rep. of Germany

[73] Assignee: Mannesmann AG, Duesseldorf, Fed. Rep. of Germany

[21] Appl. No.: 77,418

[22] Filed: Jul. 23, 1987

[30] Foreign Application Priority Data

Jul. 23, 1986 [DE] Fed. Rep. of Germany ....... 3624959

[51] Int. Cl.$^5$ .......................... H04N 7/18; G01B 11/00
[52] U.S. Cl. ..................................... 364/560; 358/107; 382/25; 356/379; 356/384; 250/306
[58] Field of Search .......................... 364/560, 562-564; 250/560, 306, 307; 356/379, 381-384, 376; 358/107; 382/25

[56]  References Cited

U.S. PATENT DOCUMENTS

| 4,152,767 | 5/1979 | Laliotis | 364/560 |
| 4,271,477 | 6/1981 | Williams | 364/560 |
| 4,375,921 | 3/1983 | Morander | 364/560 |
| 4,396,945 | 8/1983 | DiMatteo et al. | 358/107 |
| 4,486,777 | 12/1984 | Yamamura | 364/507 |
| 4,695,156 | 12/1987 | Taft | 358/107 |
| 4,710,808 | 12/1987 | Hoogenboom et al. | 364/563 |
| 4,794,262 | 12/1988 | Sato et al. | 358/107 |

Primary Examiner—Felix D. Gruber
Assistant Examiner—Brian M. Mattson
Attorney, Agent, or Firm—Ralf H. Siegemund

[57]  ABSTRACT

A method of acquiring dimensional and gauge data of objects and work pieces, such as forgings or the like, uses two image producing sensors, each being up and down tiltable about a horizontal axis and swivable from side to side about a vertical axis. At least one of the sensors is directed initially towards the object for acquiring position data on a particular point of the object such as a point of intersection of two contrast lines. One of these sensors is then positioned, including tilting and/or swiveling until a particular image field point coincides with the intersection point whereupon the other sensor has a particular image field point trained on that same particular intersection point. Finally, dimensional and guage data of the object is derived from angular position data of multiple points as so acquired by the two sensors.

7 Claims, 2 Drawing Sheets

ACQUIRING DIMENSIONS OF A LARGE OBJECT

BACKGROUND OF THE INVENTION

The present invention relates to the acquisition of threedimensional data representing measurements, dimensions, gauges, etc. of large scale objects such as free cast forging pieces or the like, with emphasis on high accuracy and precision as far as the measuring results and acquired dimensional data are concerned.

Several methods are known for measuring and gauging the dimensions of large workpieces. The most simple method are nonautomated methods using, e.g. ribbons, rulers, compasses or the like. Clearly, there is a disadvantage in this approach in that it is to a considerable extent subjective and, thus, inaccurate. Also, the data acquired in this fashion are to a very limited extent only suitable for manually inputting into a computer. In some instances, particularly where the object or parts thereof are not really accessible to a person, the approach is outright unsuitable. Examples here are high temperature objects which should not be cooled down at that point when information or its dimensions are needed.

Another method for measuring and gauging large scale objects is a geodesic method which, in modern practice, employs two theodolites. In this instance, the angular positions of the theodolites are acquired after the bearings of a particular point has been taken through these two theodolites. Data processing by means of a computer system is possible in this instance, but manual follow-up of positioning by means of sighting through the eyes is complicated, time consuming, and also not necessarily reliable.

Another method is known for contactless acquiring of the dimensions of objects using one or two dimensional operating stationary camera sensors with either video pick-up tubes of semiconductors. Here then, one has to know the distance from and angular relation to the measuring object. Owing to the limited geometric resolution and non-linearity in the optical system, as well as the sensor, large objects will in fact yield poor results.

DESCRIPTION OF THE INVENTION

It is an object of the present invention to provide a new and improved method for acquiring and measuring the dimensions of large scale objects, on an automated basis without making physical contact, strictly threedimensional and particularly without encountering the drawbacks outlined above and without compromising the accuracy.

In accordance with the preferred embodiment of the present invention, it is suggested to acquire the dimensions of an object or of portions of such an object by means of two, spaced apart twodimensionally and contactless operating sensors and that under-utilization of methods for pattern recognition, intersections of contour lines and/or other characteristic points and lines of the object are extracted from the images which are established through and provided by the sensors. Through motor operated pivoting of the sensors around two axes involving elevational up and down tilting and left or right swiveling, the acquired characteristic point of the object is placed into a definite position within the respective field of view of each of the sensors (e.g. the geometric center) and that the angular position of the sensors in that instance have in relation to each other is used to acquire positional data of the characteristic point in a three-dimensional coordinate space. Through combining several such measuring points in a computer, one ascertains the dimensions of the object.

This method, as described, can be made to operate automatically and, therefore, avoids subjectivity, as far as any manual intervention by people is concerned. Therefore, the result will have a considerably higher accuracy than prior art practice can yield. In addition, objects or portions thereof, which are difficult to access or are not accessible at all, can still be measured and gauged. One may require all dimensions of such an object and, therefore, determine its dimensions. It is not necessary to know in advance the distance of the object from the sensors or any particular angular position and orientation of the measuring object.

In accordance with another feature of the invention, it is suggested to provide a characteristic point on the object with an external marker to serve as a reference. This does not mean that it has to be a permanent marking but, e.g. the marking may be done through a highly concentrated light beam as a laser beam being projected onto the object. This way, one establishes a sharply delineating reference point. It is apparent that any visually accessible point on the surface of the object can be used as a reference point in this fashion. This means, one can cover the entire surface of the object with characteristic points for the highest possible resolution.

It is another general feature of the invention, to use interrupted and/or intercepted contrast producing edges for defining measuring points using, if necessary, local contrast enhancement for increasing the accuracy of the acquired dimensional data. One may use light sources with frontal or through illumination, or any emitted radiation itself (e.g. of hot objects).

One may initiate the measurement by prepositioning the object into a most favorable position for purposes of defining and acquiring characteristics and measuring points. This feature may permit reducing the image field through enlargement (zooming or the like), and this, in turn, will increase the accuracy of contrast acquisition and resolution of measurement.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding to the detailed description of the drawings, FIG. 1 illustrates a particular camera sensor 1, and it is understood that two of these are used (1 and 1', FIG. 4) within the system and for practicing the invention. Moreover, each of the cameras is positioned to be pivotable about two axes 2 and 3 which are perpendicular to each other, and none of which includes the optical axis. In FIG. 1 reference numeral 2 refers to an up and down tilt axis which extends transversely to the plane of the drawings, while 3 is a vertical, left-right swivel axis.

There is a schematic showing in FIG. 5 as to each of these two cameras except that in comparison to FIG. 1, the axis 2 is shown displaced by 90 degrees relative to and on axis 3. Thus, the axis 2 is shown in the plane of the drawing of FIG. 5, and the viewing direction extends perpendicular to the plane of the drawing. Moreover, FIG. 5 shows schematically two motors for each of the sensors 4 and 4'a for, respectively, turning the camera on the axis 2 and 3. In addition, there are angle encoders or track followers 5 and 5'a providing signals from which angular position indications can be derived. The angle encoders 5, 5a, etc. can be slotted disks or with other kinds of markers disks. The equipment to be described will count bidirectional passage of pulses if the motor turns about one angle or the other, and a position follow-up indication is provided for.

The two cameras 1 and 1' are positioned in relation to each other so that they have a fixed and well defined distance between them with normally parallel optical axes and swivel axes (3) and coaxially arranged tilt axes (2). This is a reasonable, universal zero position, but is not inherently necessary. Any other zero position from which measure angles are taken is conceivable. Adaptation to complex work pieces may even dictate different starting conditions for measurements.

Figure 4:
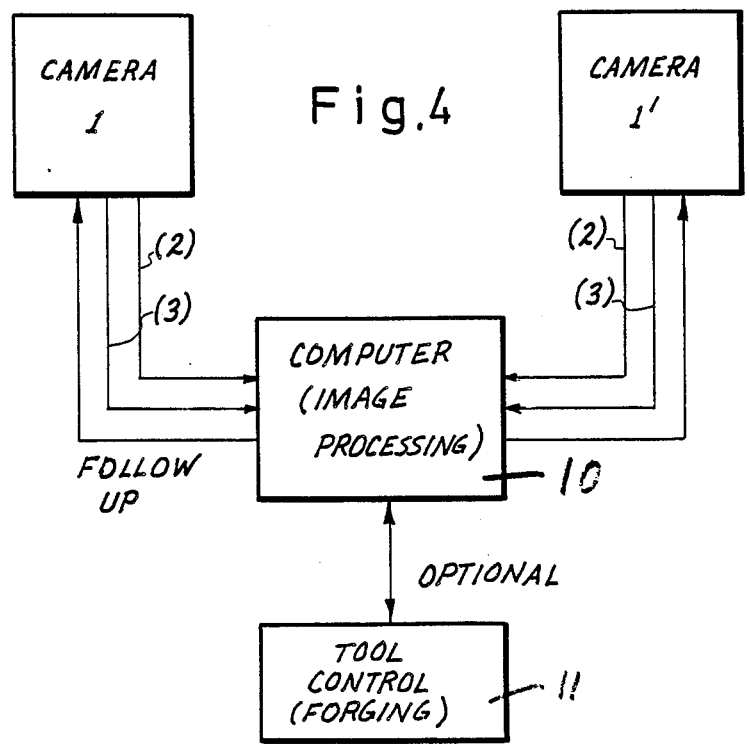
FIG. 4 is a block diagram of data processing in the process of acquisition of dimensional data and information.
Figure 5:
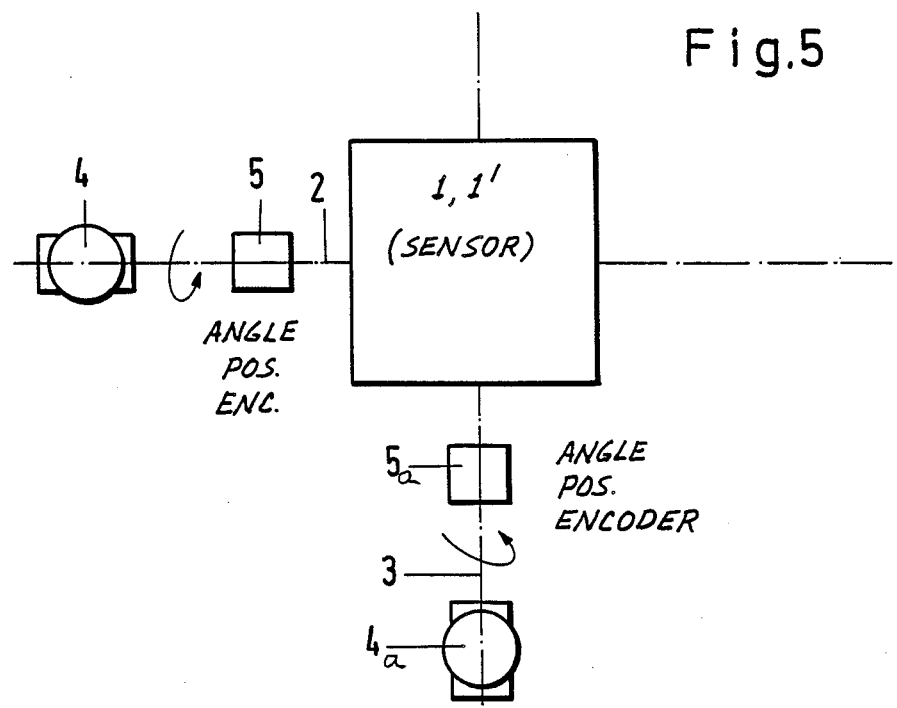
FIG. 5 is a schematic representation of the mechanical operation of the camera sensor.

FIG. 4 is a diagram of a device by means of which it can be explained how the acquisition process proceeds. One can see that the two cameras 1 and 1' provide angle data, through the respective encoders such as 5 and 5a in FIG. 5, and representing turning (tilting, swivel) angles about the respective axes 2 and 3. These angle data will be fed to a computer 10 with integrated image processing to thereby define whatever needs to be defined within the computer. Specifically and initially, the computer will run through pattern recognition processes that is to say, it will find, or try to find, algebraic-geometric representations of contrast defined lines. Such steps are carried out covering all relevant field-of-view areas, points, intersections, or so forth, and upon relating the resulting geometry to each other, one can determine any desired dimensions within the object.

The particular circuit illustrated in FIG. 4, shows that the camera sensors 1 and 1', as well as the encoding devices 5 and 5', after having acquired angular data with which the image data are processed, the camera, sensors through control of the respective adjusting motors 4 and 4' can be follow-up controlled and "homed-in" into particular positions, for example, such that the centers of each of the image fields are directed to the same point on the object.

Figure 1:
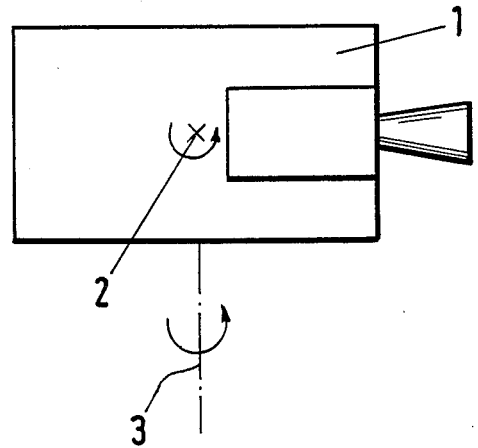
FIG. 1 is a schematic view of a camera used to practice the preferred embodiment of the present invention.
Figure 2:
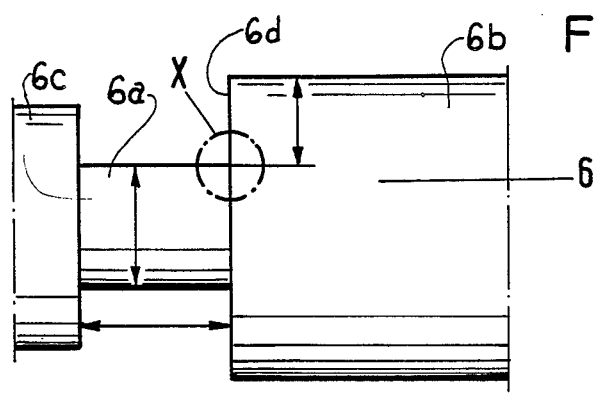
FIG. 2 is a side elevation of an example of a forging of the dimensions of which are to be acquired.
Figure 3:
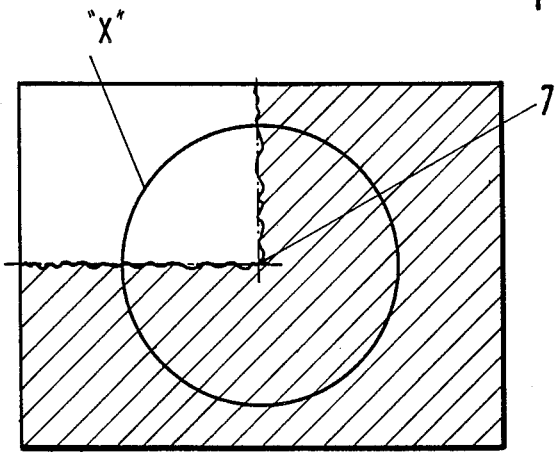
FIG. 3 illustrates an image of the item shown in FIG. 2 when acquired by means of a camera shown in FIG. 1.

FIG. 2 illustrates a forging 6 in side elevation. It is assumed that the image acquired by both cameras covers the area x. This area can be acquired by either of the two cameras and converted into appropriate signals. By means of pattern recognition, a contrast point 7 as shown in FIG. 3 is acquired, e.g. by camera generation. This point 7 is within the field of view of both cameras and is defined as the intersection of a plane that is tangent upon small diameter, cylindrical portion 6a of part 6 and runs parallel to the optical axis. The other plane is the one axial end plane 6d of the thicker portion 6b. The intersection of these two planes establishes a line of intersection, and the projection of that line head-one and into the image field of one of the cameras yields not only the image of a point. Rather that point is defined and established in the computer after processing the contrasting lines and representing them algebraically as lines. The edge intersection 7 is defined within the acquisition system as a definite point. This point can actually be found as follows:

The image acquisition process yields two possibly interrupted contrasting lines, one vertical and one horizontal. The latter is representative of the tangent plane or the small-diameter portion 6a of forging 6. The vertical straight line may be acquired by moving the piece or the camera(s) axially. Through image enhancement, the intersection can be more particularized. Any relative position of the camera, vis-a-vis work piece, other than the one illustrated and as seen by that one camera will yield a curved (ellipsoidal) contrast line. Hence, the viewing position is attained (and relative motion is stopped) when the contrasting line of interest is vertically straight. This particular procedure is not essential as seen. Rather the viewing process and contrast line detection process may detect a contrast ellipse. This ellipse can be processed algebraically to determine point 7, e.g. as an intersection of the long axis with the horizontal line that defines the horizontal tangent plane. In this case, no axial shift of camera vs. pieces 6 is necessary.

The field of view of the camera 1 is then adjusted so that its center coincides with the intersection of the two contrasting lines which, in turn, establishes as to that camera the spatial orientation of the above defined intersecting planes. This point will, in fact, be acquired through turning one of the camera sensors into a well defined position within a field of view. The other camera can now be trained on that point, as will be described next, so that through evaluation of any angle between both cameras given by processing the objects of respective angle transducer 5, one will obtain the location of point 7 within a three-dimensional space.

As stated, through appropriate positioning, e.g. camera 1, one will home in the center of the field of view on that line-point 7. Following this procedure, the particular point within the field of view, being on the extremity of the work piece, is marked, e.g. by means of a laser beam projector. Now the second camera 1' is oriented such that the marking appears in its center. Obviously, the center of that second camera cannot possibly be on line with the previous line, but owing to the preparatory procedure, it can be made to be homed in on a relevant point of that line, and that is the marking point on the periphery and edge of the large diameter portion 6b.

As that tangent point where the two axial planes intersect is marked, and the second camera 1' is then angularly adjusted so that next its centerfield of view is homed in on that second point (the first camera does not have to be changed for this procedure), one has available through the second camera an angle value which, on the basis of the geometric relationship between the two cameras, on the one hand, and the two different angles provided by the two cameras, on the other hand, yield exact information on the diameter difference between the small and the large cylindrical portion.

Critical points of the object are acquired in this fashion to thereby topologically map and acquire measurement points which in toto define the dimensions. Of course, this mapping process can be limited to portions of the object if the dimensions of portions only are to be of interest, while on the other hand, one can acquire any and all dimensions of the object to the extent the geometry permits. Physically, one may restrict the measurement acquisition and rely on principles of symmetry. As can be seen in the specific example in FIG. 2, the geometry of that part 6 is determined by (a) the three diameters of the cylindrical parts, and (b) the axial length of each of the three portions 6a, 6b, 6d, there being altogether six values that define the dimension of this particular object, and its topology is completely established by these six data values. Any local asymmetries, of course, will have to be acquired separately.

The result as provided is directly indicative of a certain dimensional parameter and that, in turn, can be used to control a machine tool 11 such as a forging device or the like. In particular, the inventive method is suitable for coupling the computer to a work tool. As a proposition, one may provide initially additional information about the expected position and roughly expected dimensions of the object. One may thus provide for a preliminary homing in of the cameras into respective range. For example, in the example above the optical axis of camera 1 was positioned to coincide with plane 6c. This, in turn, means that having prepositioned the device appropriately, one can enlarge the measuring field, i.e. the field of view observed during subsequent control can be reduced, and that increases the measuring accuracy and reduces the time for acquiring the requisite dimensions. This will increase production throughput.

The invention is not limited to the embodiments described above, but all changes and modifications thereof not constituting departures from the spirit and scope of the invention are intended to be included.

We claim:

1. Method of contactless acquiring dimensional and gauge data of objects and work pieces such as forgings comprising:

providing two image producing sensors, each being up and down tiltable about a horizontal axis, and swivable from side to side about a vertical axis and spacing them to have a particular distance between them;

directing at least one of the sensors towards the object for acquiring position data on a particular point of the object;

detecting in an image of the object, as produced by one sensor that is directed towards the object, contrasting lines and a particular point, being a point of intersection of two of the contrasting lines as detected;

positioning the one sensor, including tilting and swiveling respectively about two particular axes to have a particular image field point coincide with that particular point of intersection as imaged;

positioning the other sensor through tilting and swiveling about two particular axes to have a particular image field point of this other sensor trained on that same particular point of intersection; and deriving dimensional and gauge data of the object from angular position data of the two sensors, by repeating the directing, detecting and positioning steps in relation to other points of intersection of contrast lines of the image of the object.

2. Method as in claim 1, including the step of optically marking said particular point following acquisition by the one sensor.

3. Method as in claim 1 including the step of prepositioning the sensors in relation to the object towards contrasting lines.

4. Method as in claim 1 and including using contrast enhancement of images as produced by the sensors.

5. Method as in claim 1, wherein the swiveling and tilting being carried out by means of motors.

6. Method as in claim 1, including the step of additionally marking particular additional points, not being defined by intersections of contrast lines, through spot illumination onto a surface of the object.

7. Method as in claim 1, including in addition the step of controlling a machine tool to copy the object whose dimensional and gauge data have been acquired.

* * * * *